United States Patent [19]

Gunnarsson

[11] Patent Number: 4,812,132
[45] Date of Patent: Mar. 14, 1989

[54] ARRANGEMENT FOR DISTRIBUTING A CABLE ASSEMBLAGE BETWEN TWO MUTUALLY ROTATABLE COMPONENT PARTS

[75] Inventor: Sven-Eric Gunnarsson, Västerås, Sweden

[73] Assignee: Asea AB, Västerås, Sweden

[21] Appl. No.: 49,222

[22] Filed: May 13, 1987

[30] Foreign Application Priority Data

May 16, 1986 [SE] Sweden .............................. 8602245
May 16, 1986 [SE] Sweden .............................. 8602246

[51] Int. Cl.$^4$ ............................................ H01R 39/02
[52] U.S. Cl. ................................... 439/164; 439/13
[58] Field of Search .................. 439/11, 13, 162, 164

[56] References Cited

FOREIGN PATENT DOCUMENTS

| | | | |
|---|---|---|---|
| 220001 | 5/1958 | Australia | 439/164 |
| 856982 | 8/1940 | France | 439/164 |
| 972006 | 1/1961 | France | 439/164 |
| 518098 | 2/1940 | United Kingdom | 439/164 |

*Primary Examiner*—Eugene F. Desmond
*Attorney, Agent, or Firm*—Watson, Cole, Grindle & Watson

[57] ABSTRACT

An arrangement for distributing a cable assemblage between a stationary part and a part which is arranged for limited rotation relative to the stationary part, the cable assemblage comprising at least one power cable and at least one signal transmission cable. The arrangement includes a centrally located tubular element mounted on the stationary part and a housing which surrounds the tubular element and which is connected to the rotatable part. The signal transmission cable extends axially through the tubular element and is folded or deflected through about 90°, and extends out through an opening provided in the element and is then loosely wound helically for a number of turns around the outer surface of the tubular element. The cable then extends out through an opening in the surrounding housing and is again folded or deflected through 90°, so as to extend substantially axially along the outer surface of the housing. The arrangement also includes a co-axially arranged power-cable winding device. The winding device is arranged to rotate synchronously with the rotatable element. The power cable extends through a sleeve or loom which is fastened to the stationary part and to the winding device. The power cable extends through an opening located in the periphery of the winding device, and is folded or deflected through about 90°, so as to extend axially along the outer surface of the housing, parallel with the signal transmission cable.

9 Claims, 2 Drawing Sheets

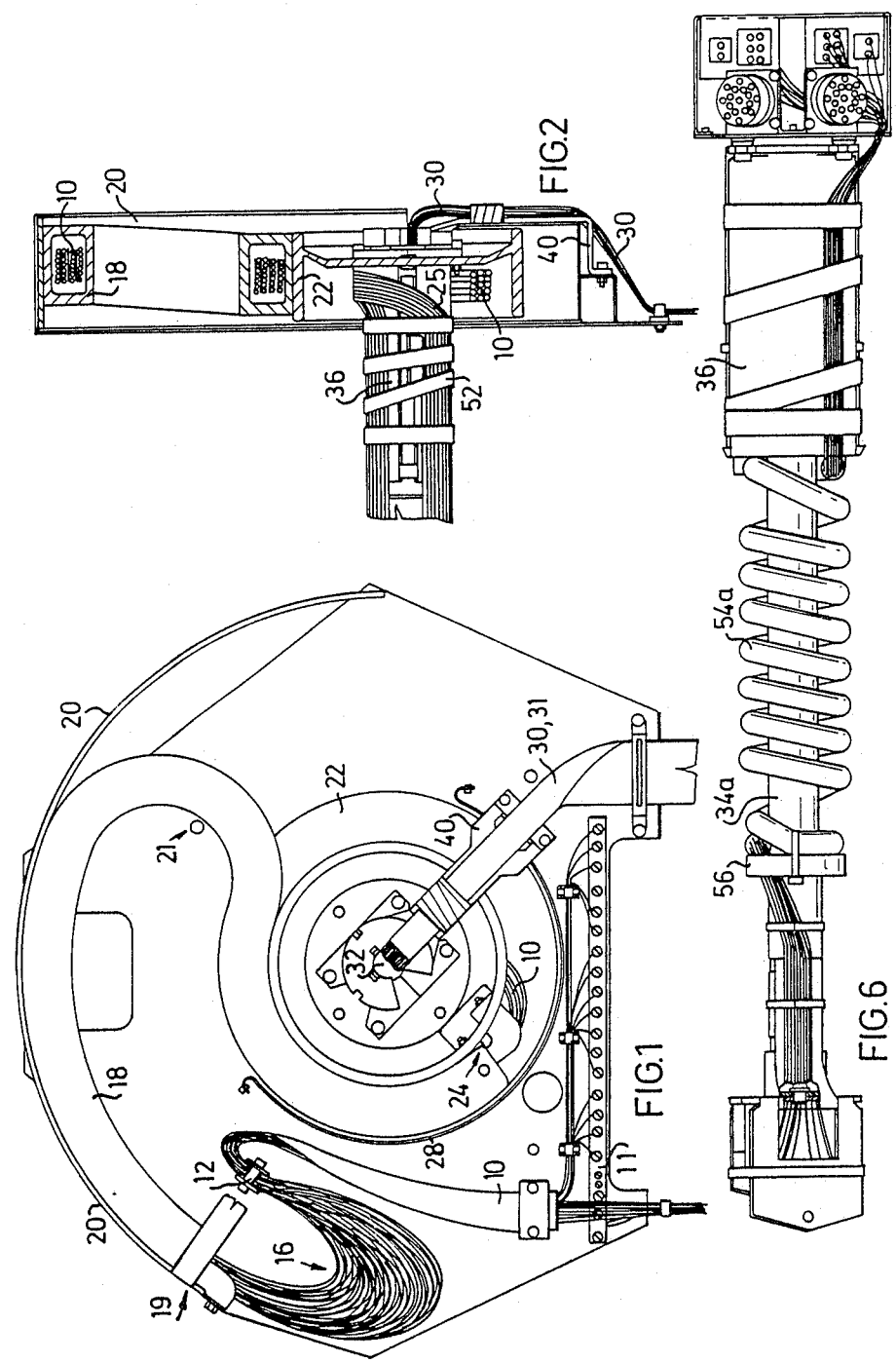

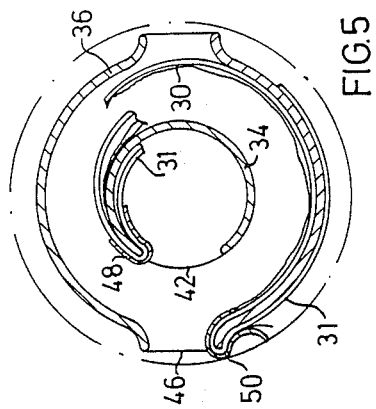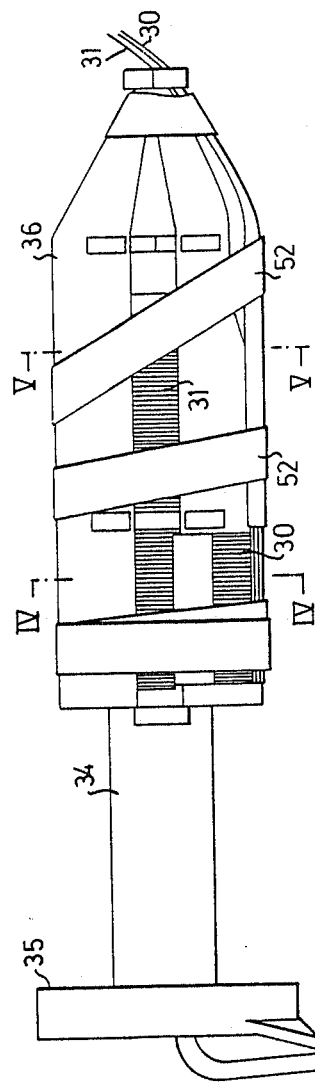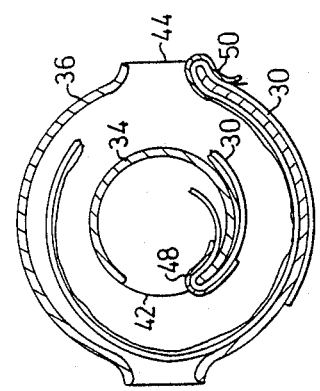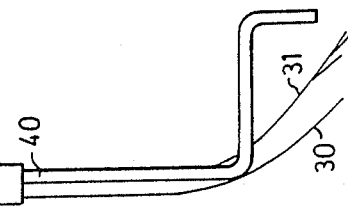

ARRANGEMENT FOR DISTRIBUTING A CABLE ASSEMBLAGE BETWEEN TWO MUTUALLY ROTATABLE COMPONENT PARTS

The present invention relates to an arrangement for distributing a cable assemblage between two component parts arranged for limited rotation relative to one another, the cable assemblage comprising one or more power cables and/or signal transmission cables, preferably in the form of multi-conductor ribbon cables.

It is of primary interest in electrically operated industrial robots to distribute the cables internally of the robot, both with regard to the power cables and to signal transmission cables, in order to protect the cables from damage through contact with objects located in the working vicinity of the robot, and to enhance the manoeuvrability of the robot in confined spaces. It is often difficult, however, to distribute cables internally of the robot, in the vicinity of the articulated joints located between the various mutually movable robot components, such as between foot and arm frame, between arm frame and lower arm, between lower arm and upper arm, between mutually rotatable sections of an upper arm, etc. Previously, the cables have been distributed through such articulated joint locations in a more or less arbitrary manner, in the form of loops or hanks arranged in a manner to permit rotation of the articulated components concerned. This has resulted in uncontrolled movements of the cables, and therewith in uncontrolled wear and tear thereon. The known cable installations are also less favourable from a servicing point of view, for example when needing to replace defective sections of cable, particularly in the vicinity of the aforesaid articulated joints between mutually movable robot components.

Consequently, it is the prime object of the present invention to avoid the drawbacks associated with known cable distribution arrangements between mutually movable components, and there is accordingly proposed to this end a cable distribution arrangement which will enable the cables to be distributed in the vicinity of articulated joints between mutually rotatable robot components in a ready and controlled fashion; which will reduce wear on said cables; which will facilitate the fitting and dismantling of a completed assembly; which will facilitate the exchange or replacement of cable sections; which will permit power cables and signal transmission cables to be distributed in an unimpeded manner, etc. In this regard, a prime endeavour is particularly one of providing an arrangement which will make it possible to produce a robot construction whose dimensions are controlled solely by structural and mechanical strength criteria, and not by the space required to accommodate the cable assemblage.

This object is achieved, particularly when distributing cables between a foot and an arm frame of an industrial robot, by means of a cable distribution arrangement or scheme which is mainly characterized in that it comprises a tubular element mounted on said stationary part and a housing which at least partly surrounds said rotatable part; in that the signal transmission cable extends axially through the tubular element and is folded or deflected through 90° and passed out through an opening located in said element and then wound helically in a number of turns around the outer peripheral surface of said tubular element; in that the cable extends out through an opening in the surrounding housing and is again turned through 90° so as to extend substantially axially along the outer surface of the housing; in that the arrangement further comprises an annular cable-winding device which is arranged co-axially with the housing and which is operative to wind the power cable onto the peripheral surface of said cable-winding device, said cable-winding device being arranged to rotate together with said rotatable element; in that the power cable is firmly attached in a tension-free manner in the stationary part and extends in the cable-winding device through a guide sleeve which guides the movement of the cable and the one end of which sleeve is connected to the stationary part and the other end of which is connected to the cable-winding device, such that in one terminal position of the rotatable part, the sleeve will extend in an arc externally of the cable-winding device and curve back towards its point of attachment to said cable-winding device, and such that in the other terminal position of said rotatable part, the sleeve will extend in a substantially sinusoidal path and embrace the greater part of the peripheral surface of the cable-winding device, wherein the power cable extends through an opening located in the periphery of the cable-winding device and is turned through about 90° so as to extend axially along the outer surface of the housing, parallel with the signal transmission cable.

This embodiment of the inventive cable distribution arrangement and further modified embodiments thereof are set forth in the following claims and are described hereinafter in more detail with reference to the accompanying drawings, in which FIG. 1 is a view from beneath of a cable distribution arrangement according to the present invention;

FIG. 2 is a side view of the arrangement illustrated in FIG. 1;

FIG. 3 is a side view of one embodiment of a signal-cable distribution arrangement according to the present invention;

FIG. 4 is a cross-sectional view taken on the line IV—IV in FIG. 3;

FIG. 5 is a cross-sectional view taken on the line V—V in FIG. 3; and

FIG. 6 illustrates a further embodiment of the invention for distributing both power cables and signal transmission cables in an industrial robot.

FIG. 1 illustrates an embodiment of the inventive arrangement which is intended for the distribution of both power cables and signal transmission cables between a foot of an industrial robot and an arm frame thereof journalled for rotation relative to the foot. A bunch of cables 10, preferably ribbon cables, enters the robot via a conductor or collector rail 11, and is firmly connected to a stationary part of the robot in a tension-free manner at 12, for example to a base plate on the foot part of the robot. The cables are passed from the attachment location 12 in a U-shaped loop 16, into and through a cable loom or sleeve 18, one end of which is attached at 19 to an arcuate support rail 20 mounted on the aforesaid plate and intended for supporting the cable loom 18. The cable loom 18 is of the known kind which can be rolled up or coiled in mutually opposite winding directions.

When the inventive arrangement occupies the state illustrated in FIG. 1, the cable loom 18 lies in abutment with the major part of the loom support rail 20, and is curved rearwardly at 21 through an angle of about 180°, into abutment with an annular cable-loom winding or coiling device 22, this device being an integral part of a robot component which is journalled for rotation on the aforesaid stationary plate, such as a rotatable axle (not shown) for example, and on which an arm frame mounted on the foot of the robot is journalled for limited rotation. The cable loom 18 is attached to the winding device 22 at 24.

The cables 10 extend freely along the cable loom 18 and exit from the loom at one open end thereof at a location adjacent the point 24 at which the loom is attached to the winding device 22, and pass radially therefrom in through a peripheral opening provided on the winding element 22, whereafter the cables are folded or deflected through 90° (at 25 in FIG. 2) so as to extend substantially axially along the rotatable part, e.g. along the outer surface of a housing on the signal-cable distribution arrangement, as described in more detail hereinafter with reference to FIGS. 3-5.

When the components and parts occupy the state illustrated in FIG. 1, the cable winding device 22 can be rotated through an angle of about 220° in an anti-clockwise direction, so as to cause the cable loom 18 to embrace the winding device 22 and take an essentially S-shaped configuration. The arrangement includes a second arcuate support rail 28, which in this latter position of said components and parts is intended to support the other side of the cable loom 18 in a manner to prevent the loom from taking an undesirable and unsuitable attitude or configuration as a result of the centrifugal forces and gravitational forces acting thereon. The cable winding device 22 can also be rotated from the illustrated position to a second terminal position, through an angle of about 180° in a clockwise direction.

Since the cable loop 16 and the cable loom 18 lie substantially on one and the same radial plane, the loop and loom will occupy but a small space in the axial direction, which is highly advantageous in the case of certain applications.

The aforedescribed cable distribution arrangement or cable distribution scheme enables movement of the power cables 10 to be readily controlled in a desired path which results in minimum wear on the cables, said cables preferably being provided with intermediate strips of a friction-reducing material, so as to reduce friction between the respective cables.

In order to enable signal transmission cables to be distributed at the same time between the robot foot and the arm frame journalled for limited rotation thereon, signal transmission cables 30 extend in the form of ribbon cables radially in towards and through an aperture 32 located in the centre of the frame foot. The constructional details of this signal cable distribution unit will be described hereinafter in more detail with reference to FIGS. 3-5.

The inventive signal cable distribution arrangement illustrated in FIG. 3 by way of example has the form of an exchangeable assembly which is intended to be mounted coaxially with the axis of rotation extending between two machine components journalled for mutual limited pivotal or rotational movement, such as two mutually rotatable parts of an industrial robot. The arrangement comprises a centrally located tube 34 which delimits the aperture 32 and has located thereon an end plate 35 for securing the tube 34 in a centrally located hole in one of the mutually rotatable parts, such as the stationary foot part of an industrial robot. The centrally located tube 34 extends into a surrounding housing 36, which is divided into two parts in an axial plane and comprises two assembled, complementary halves. The right-hand end of the housing 36 illustrated in FIG. 3 is provided with coupling means 38 intended for connection with corresponding coupling means on the other part, for example a pivotal or rotatable robot part.

The arrangement illustrated in FIG. 3 is intended preferably for distributing signal transmission cables in ribbon form in a manner to permit limited rotation between the aforesaid mutually rotatable parts. The FIG. 3 embodiment incorporates two ribbon cables 30, 31, each of which includes a plurality of mutually adjacent and mutually parallel conductors arranged to be distributed from the stationary part to the rotary part in a manner to permit relative rotation therebetween. To this end, the two ribbon cables 30, 31 extend along a radially extending attachment arm 40 connected to the end plate 34, and into the open, left-hand end of the tube 34, said ribbon cables 30, 31 being electrically screened from one another, with the aid of intermediate strip-like screening material. The two ribbon cables extend, however, at different lengths into the part of the tube 34 surrounded by the housing 36. The one ribbon cable 30 is deflected or folded radially outwards through an angle of 90°, on a level with the section through the arrangement illustrated in FIG. 4, and extends through an axial, slot-like opening 42 in the tube 34. The ribbon cable 30 is then loosely wound helically for a number of turns externally of the tube 34, and then extends out through an opening 44 in the housing 36. The cable 30 is again folded through about 90° on the outside of the housing 36, so as to extend axially along the outside of the housing 36 towards a connecting location on the rotatable part.

The other ribbon cable 31 extends axially further into the tube 34, to a level commensurate with the section according to FIG. 5, where it is also folded radially outwards through 90°, through the slot-like opening 42 in the tube 34. The ribbon cable 31 is then loosely wound helically for a number of turns outside the tube 34, but in an opposite direction in relation to the winding direction of the cable 30, and then extends out through an opening 46 located diametrically opposite the opening 44, so that the cables 30, 31 are able to extend together on the outside of the housing 36, while being mutually screened from one another by an intermediate screening element.

As illustrated in FIGS. 4 and 5, the cables 30, 31 are secured in position by means of a clamp or clip 48, 50 in the vicinity of the cable lead-throughs 42, 44, 46 located in the tube 34 and the housing 36 respectively. Thus, the outer housing 36 is able to rotate to a limited extent relative to the tube 34, this movement of the respective helically wound cable loops between the housing 36 and the tube 34 being taken up by coiling and uncoiling of the respective loops. This axially spaced positioning of the cable helices is necessitated by the fact that it has not been found possible to screen reliably a plurality of mutually superimposed ribbon cables when said cables are helically wound in the manner described and illustrated. In the absence of a reliable screen between respective cables, the cables are liable to cause unacceptable interference therebetween.

The two cable loops are secured in position in the transverse direction of the cables in respective pockets formed between the inner surface of the housing 36 and the outer surface of the tube 34. This enables the ribbon cables to coil around each other without the conductors in respective cables causing interference with other conductors in adjacent turns. Consequently, no separate screening is required between the respective turns of the cables.

One advantage afforded when winding the cables 30, 31 in mutually different directions is that the centre tube 34 is therewith able to rotate to a limited extent in both directions, which enables the coupling means 38 of the housing 36 to be brought more readily into a correct position for connection with the corresponding coupling means on the pivotal or rotatable part.

The cables 30, 31 are secured to the outer surface of the housing 36 by means of a strip of material 52, which is wound around the housing 36 and the cables 30, 31, in a manner which will simultaneously secure the housing halves to one another.

Those parts of the cables 30, 31 located upstream and downstream of the cable distribution arrangement may be provided with electrical connectors (not shown), thereby enabling the cable distribution arrangement to be readily fitted to the machine or robot and dismantled therefrom in the form of an exchangeable assembly.

When it is desired to distribute electrical heavy current cables, or power cables, together with signal transmission cables when the axial space is not as critical as in the case of the distribution arrangement illustrated in FIGS. 1 and 2, for example between two mutually rotatable parts of an industrial robot, the centre tube presents an elongated part 34a in front of the housing 36, as illustrated in FIG. 6. The signal transmission cables are passed, in the previously described manner, through the tube 34a and are drawn out on the outside of the housing 36 via helical coils. A multi-conductor power cable 54 is drawn along the outside of the tubular part 34a up to an attachment 56, where the cable distribution scheme passes from an axial distribution scheme to an elongated, helical distribution scheme 54a. The other end of the helically extended cable is attached to the rotatable housing 36, and is then extended axially along the outside of the housing on a part thereof not occupied by the signal transmission cables. This enables a common cable distribution assembly for power and signal cables to be obtained, without the power cables interferring with the signal transmission cables.

I claim:

1. An arrangement for distributing a cable assembly between two parts which are journalled for limited rotation relative to one another, said cable assemblage comprising two or more signal transmission cables, preferably in the form of multi-conductor ribbon cables, characterized by a tubular element which is intended to be mounted on one of said parts co-axially with the axis of rotation between said parts, and a housing which is arranged to surround at least partially the tubular element and to be connected to the other of said parts, the signal transmission cables extending axially through the tubular element and being folded or deflected through 90° and extending out through an opening in the element and then being loosely wound helically for a number of turns around the outside of the tubular element, whereafter the cables extend out through an opening in the surrounding housing and are again folded through about 90° so as to extend substantially along the outside of the housing, said cables being folded through about 90° and extend out through the opening in the tubular element at locations axially spaced therealong, said cables being loosely wound helically outside the tubular element in opposite winding directions.

2. An arrangement according to claim 1, characterized in that the loosely wound helical part of respective cables is secured in position in the transverse direction of the cable in a pocket formed between the tubular element and the surrounding housing.

3. An arrangement according to claim 1, characterized in that the tubular element is rotatably journalled in the housing.

4. An arrangement for distributing at least one power cable and at least one signal transmission cable between two mutually rotatable parts with the cables mutually separated from one another, comprising a tubular element adapted to be mounted on one of said parts coaxially with the axis of rotation between the parts, and a housing arranged to surround at least partially the tubular element and to be connected to the other of said parts, said tubular element having an extension which projects axially away from the housing, wherein the power cable extends externally of the tubular element extension and is wound helically along at least a part of the length of said extension at a radial distance therefrom, one end of the helically wound cable being secured to the tubular element while the other end of said cable being secured to the housing, and wherein the signal transmission cable extends axially through the tubular element and the extension thereof and being folded through about 90° and extending through an opening in the element and then being loosely wound helically for a number of turns around the outside of the tubular element, whereafter the cable extends out through an opening in the surrounding housing and is again folded through about 90° so as to extend substantially axially along the outside of the housing.

5. An arrangement according to claim 4, characterized in that the power cable and the signal transmission cable extend substantially axially on the outer surface of the housing on sections thereof which are spread apart in the peripheral direction of said housing.

6. An arrangement for distributing a cable assemblage between a stationary part and a part which is journalled for limited rotation in relation to the stationary part, said cable assemblage comprising at least one power cable and at least one signal transmission cable, both of which preferably have the form of a multi-conductor ribbon cable, characterized in that the arrangement comprises a tubular element mounted on said stationary part and a housing which at least partly surrounds the rotatable part; in that the signal transmission cable is extended axially through the tubular element, and is folded through 90° and passed out through an opening located in said element and then wound helically through a number of turns around the outside of said tubular part; in that the cable is extended out through an opening in the surrounding housing and again turned through about 90° so as to extend substantially axially along the outside of the housing, in that the arrangement further comprises an annular cable-winding device which is arranged co-axially with the housing and is operative to wind the power cable onto the peripheral surface of said cable-winding device, said cable-winding device being arranged to rotate together with said rotatable element; in that the power cable is firmly attached in a tension-free manner in the stationary part and extends in the cable-winding device through a guide sleeve which guides the movement of the cable and the one end of which sleeve is connected to the stationary part and the other end of which is connected to the cable-winding device, such that in a first terminal position of the rotatable part the sleeve will extend in an arc externally of the cable-winding device and is curved back towards its point of attachment to said cable-winding device, and such that in a second terminal position of said rotatable part, the sleeve extends in a substantially sinusoidal path and embraces the greater part of the peripheral surface of said cable-winding device, the power cable extending through an opening in the periphery of the cable-winding device and being turned through about 90° so as to extend axially along the outer surface of the housing, parallel with the signal transmission cable.

7. An arrangement for distributing a cable assemblage between stationary part and a part which is journalled for limited rotation relative to the stationary part, said cable assemblage comprising at least one power cable, preferably in the form of a multi-conductor ribbon cable, characterized in that the power cable is firmly secured in said two parts in a tension-free manner; in that the cable extends through a sleeve which controls movement of the cable and one end of which sleeve is secured to the stationary part and the other end of which is secured to a sleeve winding device which is rotatable together with the rotatable part such that the sleeve in one terminal position of the rotatable part extends in an arc externally of the sleeve winding device and is curved back towards its point of attachment to the sleeve winding device; and in that in the second terminal position of the rotatable part the sleeve extends substantially in a sinusoidal path and embraces the major part of the periphery of the sleeve winding device, the power cable extending through an opening in the periphery of the sleeve winding device and being folded or deflected through 90° in a direction substantially axially with the axis of rotation between said parts.

8. An arrangement according to claim 7, characterized by an external arcuate support rail intended for supporting the radially outward facing side of the sleeve in said one terminal position of the rotatable part, and a radially inward arcuate support rail which is intended to support the other side of the sleeve when said sleeve embraces the sleeve winding device.

9. An arrangement according to claim 8, characterized in that the power cable is extended in a substantially U-shaped loop between the tension-relieving attachment point of the cable on the stationary part and the sleeve attachment point on said stationary part.

* * * * *